(12) United States Patent
Inoue et al.

(10) Patent No.: US 7,930,826 B2
(45) Date of Patent: Apr. 26, 2011

(54) METHOD FOR MANUFACTURING A FASTENING PORTION FOR A STEERING APPARATUS

(75) Inventors: Koji Inoue, Maebashi (JP); Yasushi Watanabe, Maebashi (JP); Koji Marumo, Fujioka (JP); Junichi Okada, Fujioka (JP)

(73) Assignees: NSK Ltd., Tokyo (JP); Gunma Seiko Co., Ltd., Gunma (JP)

( * ) Notice: Subject to any disclaimer, the term of this patent is extended or adjusted under 35 U.S.C. 154(b) by 708 days.

(21) Appl. No.: 11/930,424

(22) Filed: Oct. 31, 2007

(65) Prior Publication Data

US 2008/0118326 A1 May 22, 2008

(30) Foreign Application Priority Data

Nov. 22, 2006 (JP) .................. 2006-316134

(51) Int. Cl.
*B21D 53/88* (2006.01)
*B21D 41/02* (2006.01)
*B21D 41/04* (2006.01)
*B21C 37/30* (2006.01)

(52) U.S. Cl. ..... 29/897.2; 29/557; 72/370.01; 72/370.1; 72/370.14; 72/370.24; 72/370.25

(58) Field of Classification Search ............... 29/897.2, 29/557, 558; 72/370.01, 370.1, 370.13, 370.14, 72/370.24, 370.25, 370.26, 370.27
See application file for complete search history.

(56) References Cited

U.S. PATENT DOCUMENTS 3,867,050 A    2/1975   Pitner

FOREIGN PATENT DOCUMENTS

| CN | 1138540 A | 12/1996 |
|---|---|---|
| DE | 196 16 274 A1 | 12/1996 |
| DE | 199 25 701 A1 | 12/1999 |
| GB | 1223828 | 10/1969 |
| JP | 658124 B2 | 8/1994 |
| JP | 200097245 A | 4/2000 |

OTHER PUBLICATIONS

Chinese Office Action dated Mar. 6, 2009.

*Primary Examiner* — Jermie E Cozart
(74) *Attorney, Agent, or Firm* — Sughrue Mion, PLLC (57) ABSTRACT

When an outer circumference of a clamping portion 25 and an outer circumference of a circular outer circumference 26 are restrained by a die 6 while inserting a non-circular punch 5 into a circular hole 28, paddings 27, 27 are pressed by a semi-circular inner circumference of the die 6 to thereby be forced into interior of the circular hole 28. The volume of the paddings 27, 27 is set to be substantially the same as a volume obtained by subtracting the volume of a non-circular hole 23 in an extension shaft 2 from the volume of the circular hole 28. The circular hole 28 is deformed, and the paddings 27, 27 forced into the circular hole 28 abut with inclined planes 52, 52 of the punch 5, whereby the non-circular hole 23 is formed in the extension shaft 2.

2 Claims, 9 Drawing Sheets

METHOD FOR MANUFACTURING A FASTENING PORTION FOR A STEERING APPARATUS

BACKGROUND OF THE INVENTION

1. Field of the Invention

The present invention relates to a fastening portion for a steering apparatus which has a non-circular hole for fastening a non-circular shaft portion at an end of a rotational shaft in order to transmit a rotational torque of a steering apparatus and more particularly to a fastening portion of an extension shaft which has a non-circular hole for fastening a non-circular shaft portion at an end of a pinion shaft which is brought into mesh engagement with a rack of a steering gear and a manufacturing method for the same.

2. Description of Related Art

As a fastening portion for a steering apparatus like one described above, as is described in Japanese Utility Model Unexamined Publication JP-UM-A-55-38024, there is a universal joint which includes a fastening portion for fastening a non-circular shaft portion which is defined by two parallel planes. In addition, as a method for fastening portion for a steering apparatus, there is a method, described in Japanese Patent Examined Publication JP-B-6-58124, for producing a universal joint.

Figure 11A:
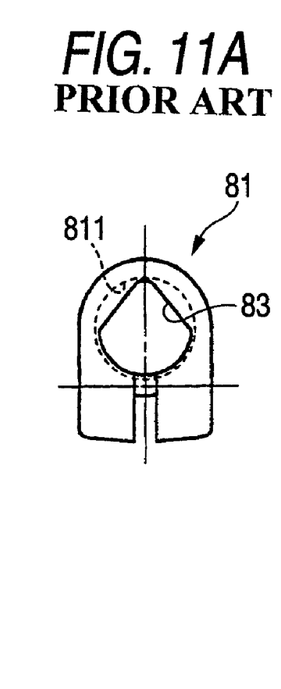
FIGS. 11A-11C are process diagram showing a conventional manufacturing method for an extension shaft in which a fastening portion is formed by broaching.
Figure 11B:
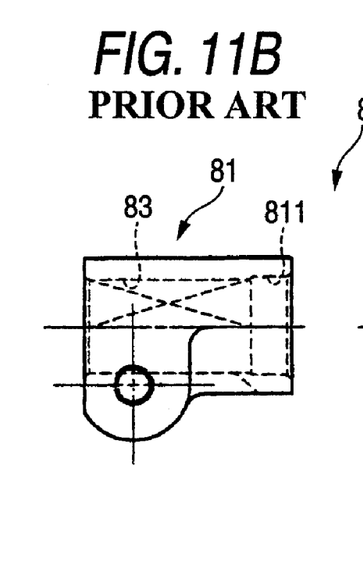
Figure 11C:
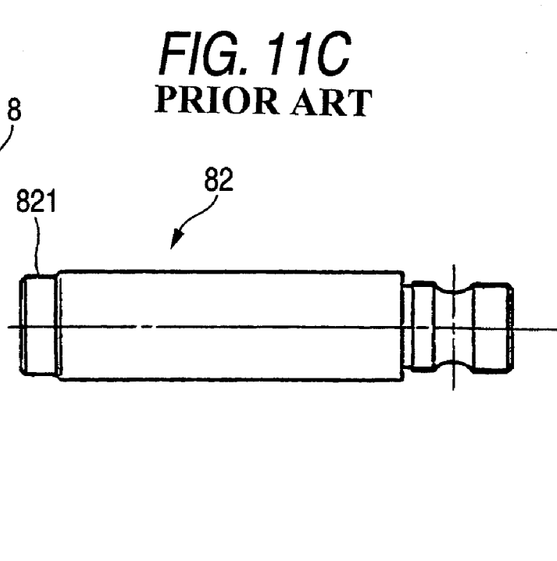

FIG. 6 is a process diagram which shows a manufacturing method for a conventional extension shaft in which a fastening portion is formed by broaching. As shown in FIGS. 11A, 11B, 11C, in a conventional extension shaft 8 in which a fastening portion is formed by broaching, in order to broach a non-circular hole in a fastening portion 81, the fastening portion 81 is formed separately from a shaft portion 82.

Figure 12:
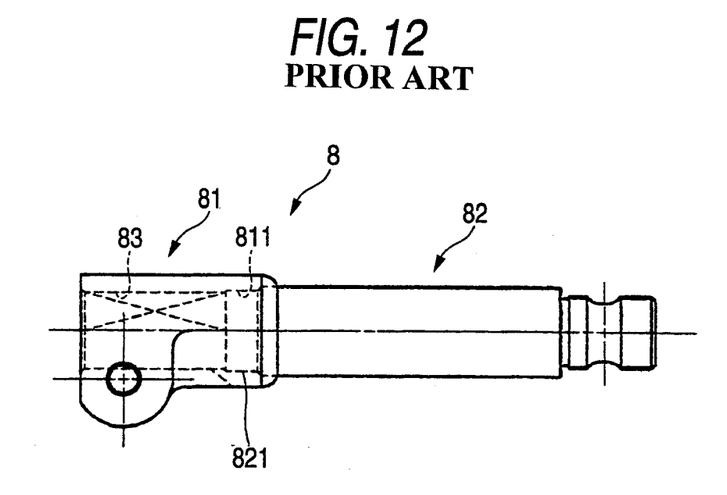
FIG. 12 is a component diagram showing the extension shaft formed by the manufacturing method shown in FIGS. 11A-11C.

The non-circular hole 83, which passes through the fastening portion 81 in an axial direction (in a horizontal direction in FIG. 11B) of the fastening portion 81 at an axial center thereof, is broached. Thereafter, as shown in FIG. 12, a small diameter shaft portion 821 at a left end of the shaft portion 82 is fitted in a circular hole 811 at a right end of the fastening portion 81, and the fastening portion 81 and the shaft portion 82 are joined together integrally by means of welding.

Consequently, the extension shaft 8 is thermally deformed by heat generated at the time of welding, whereby the dimension accuracy is reduced, and the number of working processes is increased, leading to a problem that the production costs are increased.

Figure 13A:
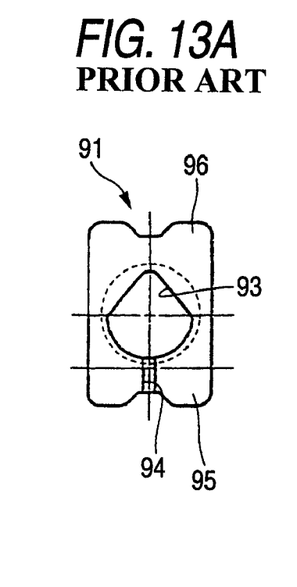
FIGS. 13A, 13B are process diagram showing a conventional manufacturing method for an extension shaft in which a fastening portion is formed by forging.
Figure 13B:
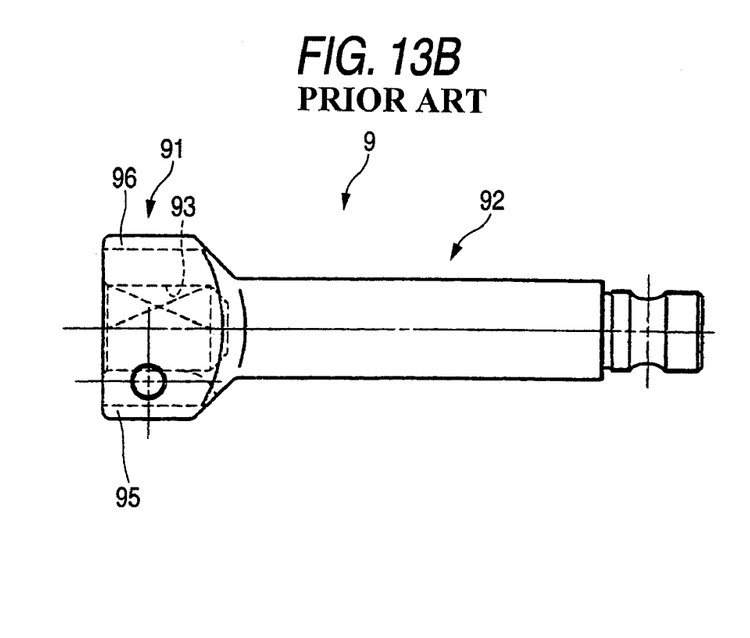

FIGS. 13A, 13B are process diagrams which shows a manufacturing method for a conventional extension shaft in which a fastening portion is formed by forging. As shown in FIGS. 13A, 13B, in an extension shaft 9 in which a fastening portion is formed by forging, a fastening portion 91 and a shaft portion 92 are forged integrally, and a non-circular hole 93 in the fastening portion 91 is also formed by forging at the same time that the fastening portion 91 is forged.

When the non-circular hole 93 is forged at the same time that the fastening portion 91 is forged, since an eccentric load is applied to the fastening portion 91 while the non-circular hole 93 is being forged, the fastening portion 91 collapses. In order to bear effectively the eccentric load to prevent the collapse of the fastening portion 91, a padding 96, which is formed into a symmetrical shape with a clamping portion 95 having a slot 94, is added to an exterior of the fastening portion 91 on an opposite side to a side where the clamping portion 95 is provided.

Consequently, this has resulted in a problem that the weight of the extension shaft 9 is increased and a space necessary for the attachment of the extension shaft 9 to a vehicle body is increased.

SUMMARY OF THE INVENTION

A problem to be solved by the invention is to provide a fastening portion for a steering apparatus which is light in weight and which requires only a small space for attachment thereof to a vehicle body and a manufacturing method for the same fastening portion.

The problem is to be solved by the following means.

According to an aspect of the invention, there is provided a manufacturing method for a fastening portion for a steering apparatus which includes:

a shaft portion which transmits rotational torque inputted from a steering wheel to a rotational shaft; and the fastening portion which is integrally provided at one end of the shaft portion and includes a non-circular hole to which a non-circular shaft portion at an end of the rotational shaft is fitted, the manufacturing method including:

forming a padding of which volume is equivalent to a difference between a volume of a preparation hole and a volume of the desired non-circular hole on an outer circumference of the fastening portion;

forming the preparation hole of which volume is larger than the volume of the desired non-circular hole in the fastening portion;

inserting a punch of which shape of a non-circular outer circumference is the same as the shape of the desired non-circular hole into the preparation hole; and restraining the outer circumference of the fastening portion by a die of which an inner circumferential shape is the same as an outer circumferential shape of a desired fastening portion and pushing the padding into the preparation hole so as to make the preparation hole to the desired non-circular hole.

According to another aspect of the invention, the preparation hole can be a circular hole.

According to the other aspect of the invention, there is provided a fastening portion for a steering apparatus including:

a shaft portion which transmits rotational torque inputted from a steering wheel to a rotational shaft;

the fastening portion which is integrally provided at one end of the shaft portion and includes a non-circular hole to which a non-circular shaft portion at an end of the rotational shaft is fitted, wherein the fastening portion is manufactured by following manufacturing method including:

forming a preparation hole of which volume is larger than a volume of the desired non-circular hole in the fastening portion;

forming a padding of which volume is equivalent to a difference between the volume of the preparation hole and the volume of the desired non-circular hole on an outer circumference of the fastening portion;

inserting a punch of which shape of a non-circular outer circumference is the same as the shape of the desired non-circular hole into the preparation hole; and restraining the outer circumference of the fastening portion by a die of which an inner circumferential shape is the same as an outer circumferential shape of a desired fastening portion and pushing the padding into the preparation hole so as to make the preparation hole to the desired non-circular hole.

According to the other aspect of the invention, the fastening portion can be a fastening portion of an extension shaft.

According to the manufacturing method of the invention, since the necessity of adding the symmetrically shaped padding to the fastening portion is obviated, the steering apparatus fastening portion is reduced in weight, and only a small space has to be necessary for the attachment of the steering apparatus fastening portion to the vehicle body.

DETAILED DESCRIPTION OF THE PREFERRED EMBODIMENTS

Hereafter, accompanying with drawings, embodiments of the present invention are explained.

Figure 1:
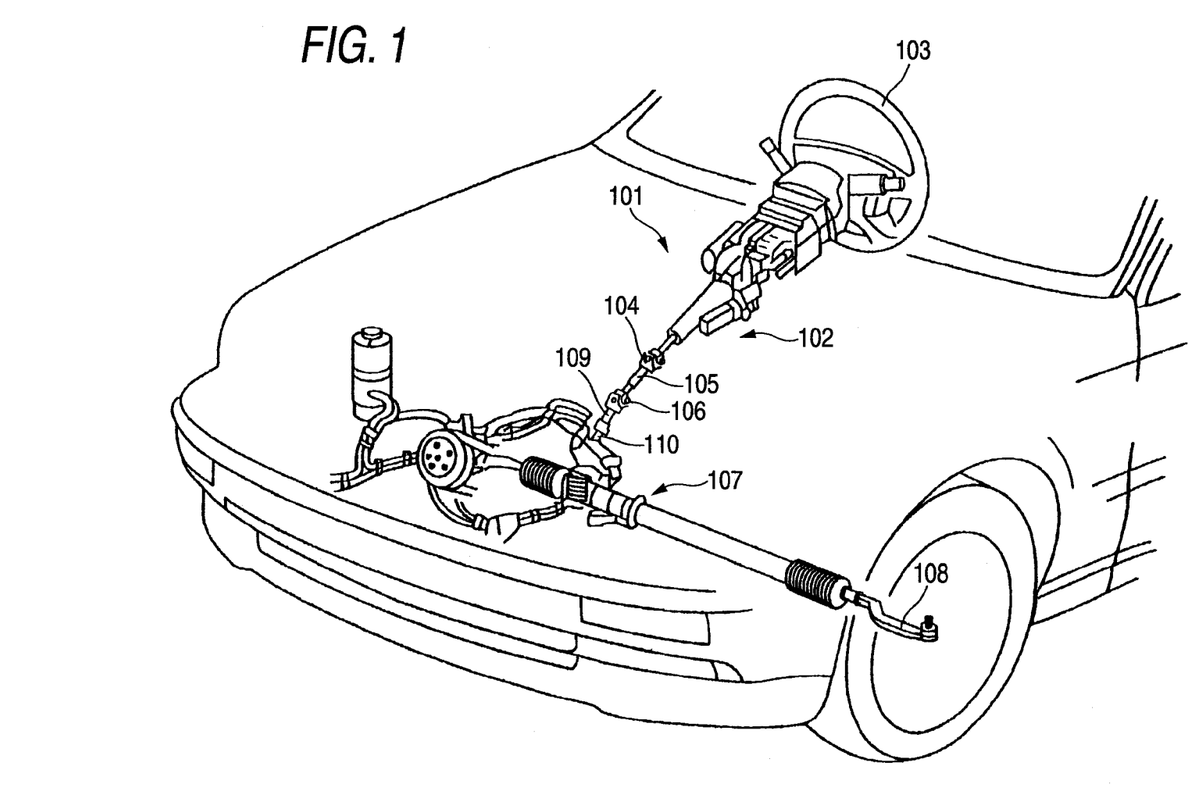
FIG. 1 is an overall perspective view showing a state in which a steering apparatus is mounted on a vehicle which includes a fastening portion for a steering apparatus according to the invention.
Figure 2:
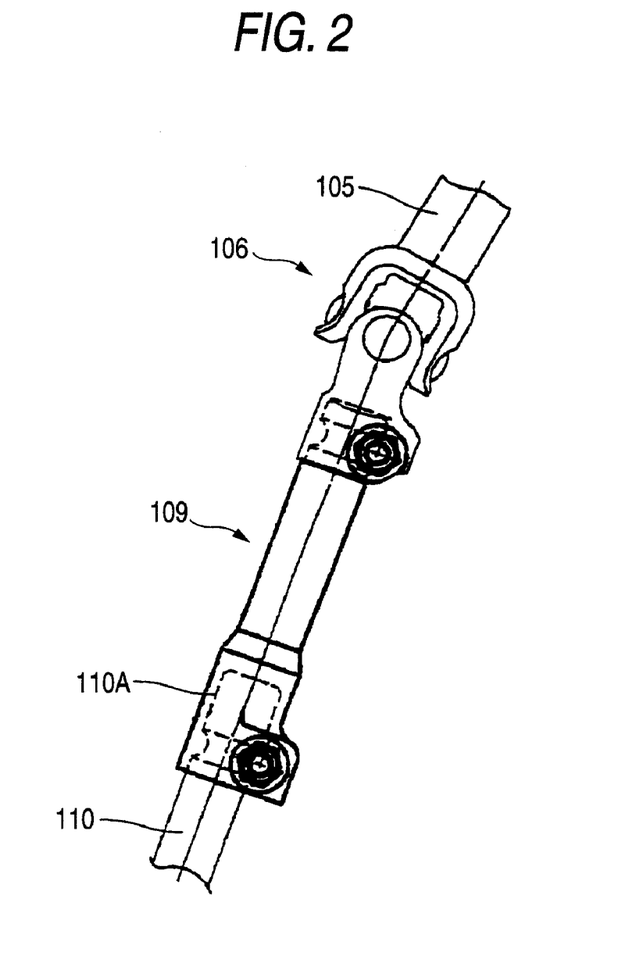
FIG. 2 is an enlarged front view showing an extension shaft shown in FIG. 1.
Figure 3A:
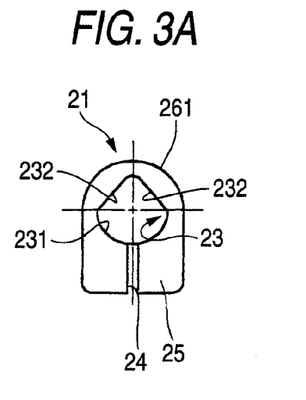
FIGS. 3A, 3B are component diagrams showing an example of an extension shaft which is produced by a manufacturing method of the invention.
Figure 3B:
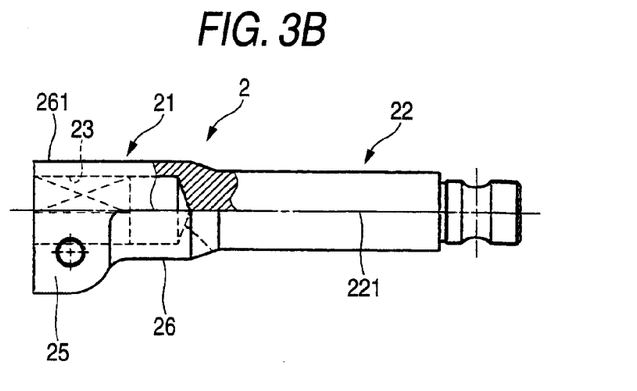
Figure 5A:
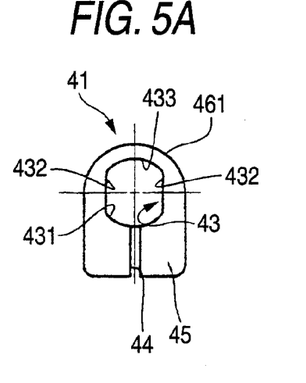
FIGS. 5A, 5B are component diagrams showing another modified example of the extension shaft shown in FIGS. 3A, 3B.
Figure 5B:
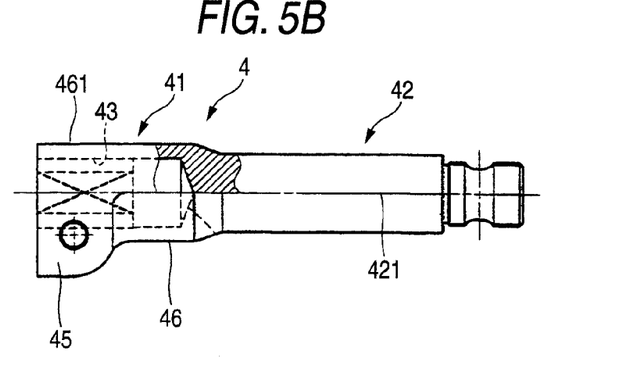
Figure 6A:
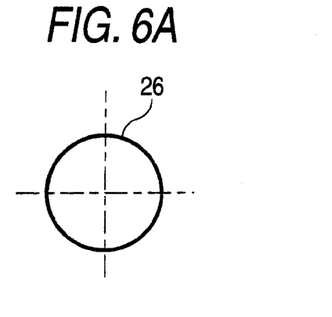
FIGS. 6A, 6B are process diagrams showing a first step of a manufacturing method for the extension shaft of the invention.
Figure 6B:
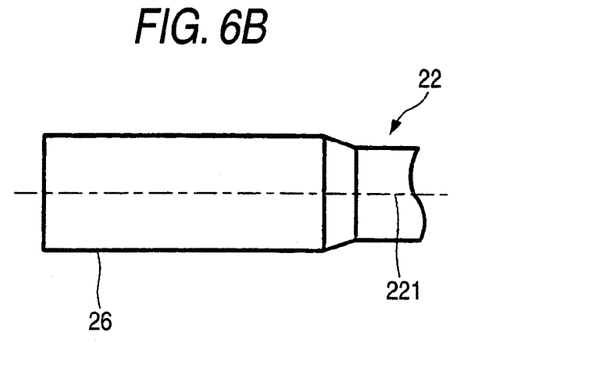
Figure 7A:
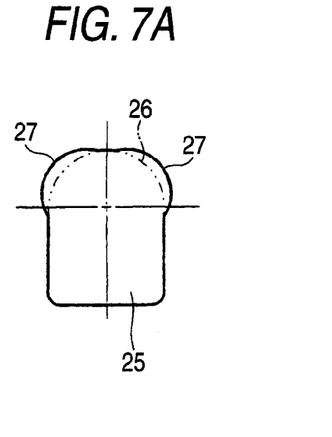
FIGS. 7A, 7B are process diagrams showing a second step of the manufacturing method for the extension shaft of the invention.
Figure 7B:
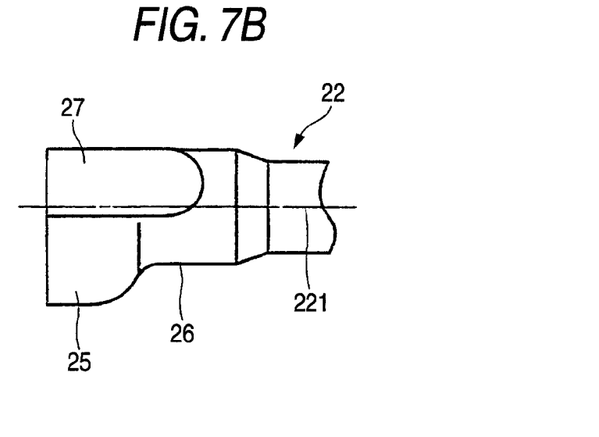
Figure 8A:
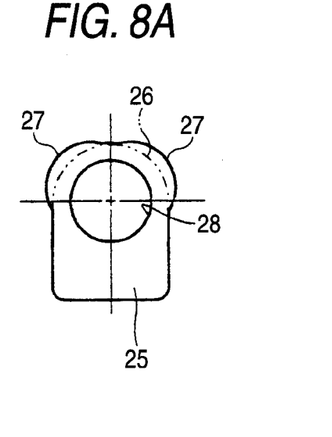
FIGS. 8A, 8B are process diagrams showing a third step of a manufacturing method for the extension shaft of the invention.
Figure 8B:
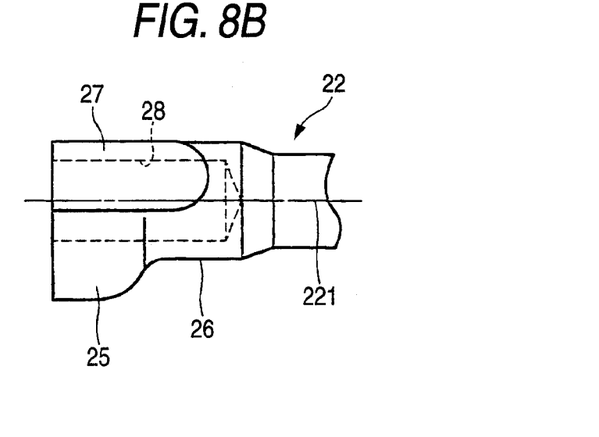
Figure 9A:
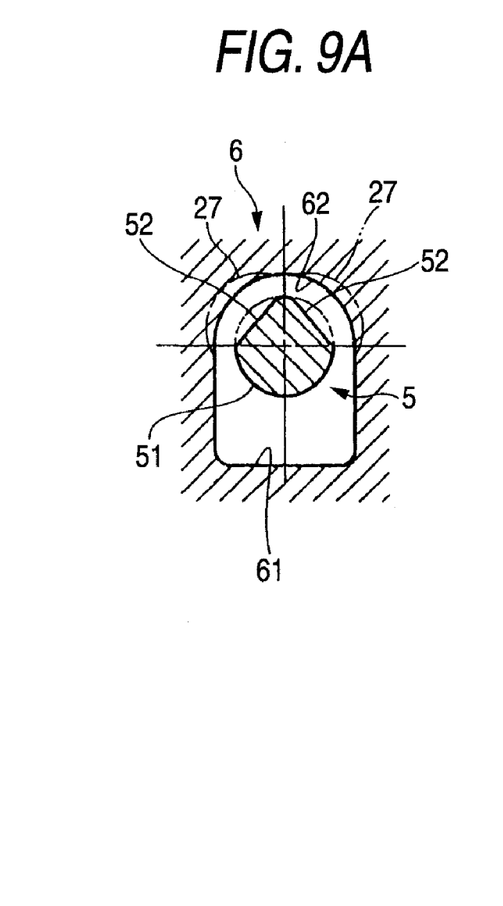
FIGS. 9A, 9B are process diagrams showing a fourth step of a manufacturing method for the extension shaft of the invention.
Figure 9B:
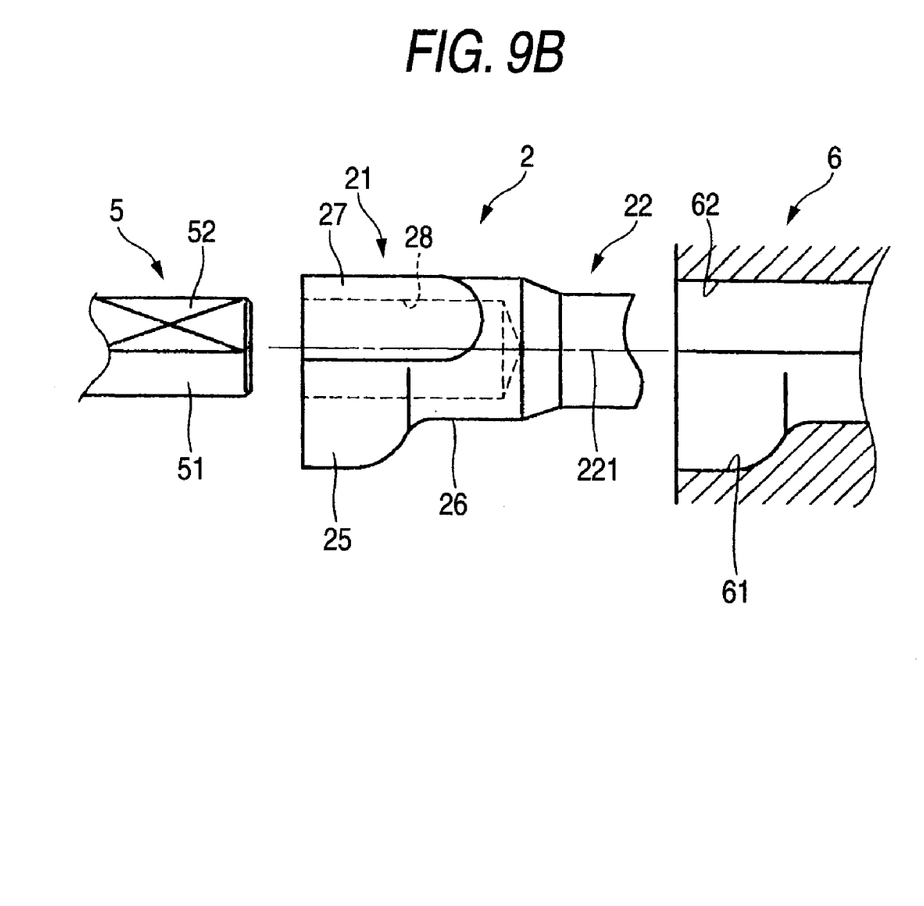
Figure 10A:
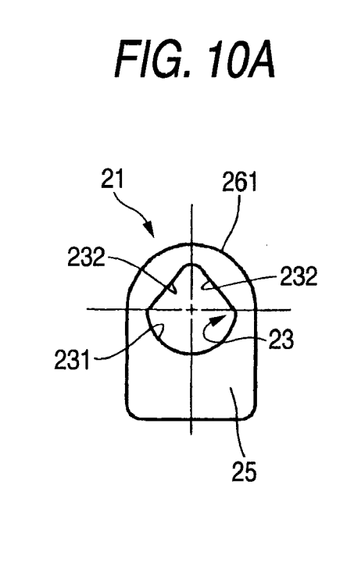
FIGS. 10A, 10B are component diagrams showing the extension shaft which has completely been formed.
Figure 10B:
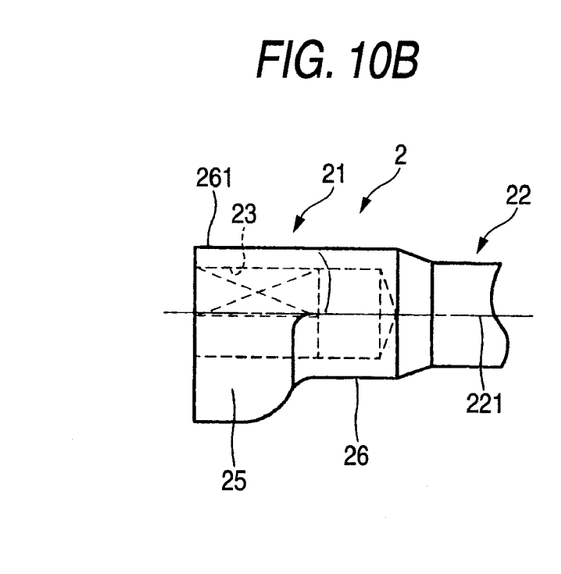

FIG. 1 shows an overall perspective view showing a state in which a steering apparatus is mounted on a vehicle which includes a fastening portion for a steering apparatus according to the invention. FIG. 2 is an enlarged front view showing an extension shaft shown in FIG. 1. FIGS. 3A, 3B are component diagrams showing an example of an extension shaft which is produced by a manufacturing method of the invention. FIGS. 4B, 4B are component diagrams showing a modified example of the extension shaft shown in FIGS. 3A, 3B. FIGS. 5A, 5B are component diagrams showing another modified example of the extension shaft shown in FIGS. 3A, 3B. FIGS. 6A, 6B are process diagrams showing a first step of a manufacturing method for the extension shaft of the invention. FIGS. 7A, 7B are process diagrams showing a second step of the manufacturing method for the extension shaft of the invention. FIGS. 8A, 8B are process diagrams showing a third step of a manufacturing method for the extension shaft of the invention. FIGS. 9A, 9B are process diagrams showing a fourth step of a manufacturing method for the extension shaft of the invention. FIGS. 10A, 10B are component diagrams showing the extension shaft which has completely been formed. FIGS. 11A-11C are process diagram showing a conventional manufacturing method for an extension shaft in which a fastening portion is formed by broaching. FIG. 12 is a component diagram showing the extension shaft formed by the manufacturing method shown in FIGS. 11A-11C. FIGS. 13A, 13B are process diagram showing a conventional manufacturing method for an extension shaft in which a fastening portion is formed by forging.

As shown in FIGS. 1, 2, in a steering apparatus 101, a steering shaft 102 is supported rotatably. A steering wheel 103 is mounted at an upper end (an end facing the rear of a vehicle) of the steering shaft 102, and an intermediate shaft 105 is coupled to a lower end (an end facing the front of the vehicle) of the steering shaft 102 via a universal joint 104.

A universal joint 106 is coupled to a lower end of the intermediate shaft 105, and an extension shaft 109 is coupled to the universal joint 106. A non-circular shaft portion 110A (refer to FIG. 2) at an upper end of a pinion shaft 110 is fastened a lower end of the extension shaft 109, and a pinion (not shown), at a lower end of the pinion shaft 110 is in mesh engagement with a rack (not shown) of a steering gear 107.

When the driver operates to rotate the steering wheel 103, a rotational force exerted on the steering wheel 103 is transmitted to the steering gear 107 via the steering shaft 102, the universal joint 104, the intermediate shaft 105, the universal joint 106, the extension shaft 109 and the pinion shaft, and the rotational force so transmitted shifts tie-rods 108, whereby the steering angle of steered road wheels can be changed.

An example of an extension shaft that is produced by a manufacturing method of the invention is shown in FIGS. 3A-5B. As shown in FIGS. 3A, 3B, in an extension shaft 2 that is produced by the manufacturing method of the invention, a fastening portion 21 and a shaft portion 22 are formed integrally, and a non-circular hole 23 is forged in the fastening portion 21.

The non-circular hole 23 shown in FIGS. 3A, 3B is made up of a semi-circular hole 231 which is centered at a center axis 221 of the shaft portion 22 and inclined planes 232, 232 which extend from both ends of the semi-circular hole 231 with an inclination of, for example, 45 degrees. A non-circular shaft portion 110A (refer to FIG. 2) at an upper end of the pinion shaft 110, which is formed into the same shape as that of the non-circular hole 23, is fitted in the non-circular hole 23 to thereby be fastened therein. Note that although the inclination angle of the inclined planes 232, 232 is 45 degrees in this embodiment, the invention is not limited thereto, and hence, the inclined planes can be inclined at 60 degrees or any of arbitrary angles.

A substantially rectangular clamping portion 25 having a slot 24 is formed on the semi-circular hole 231 side of the fastening portion 21. In FIG. 3B, a circular outer circumference 26, which is concentric with the shaft portion 22 and which has a larger diameter than the diameter of the shaft portion 22, is formed on a right-hand side half portion of the fastening portion 21. In addition, a semi-circular outer circumference 261, which has the same diameter as that of the circular outer circumference 26, is formed on an exterior of the fastening portion 21 on the side where the inclined planes 232, 232 are formed.

Figure 4A:
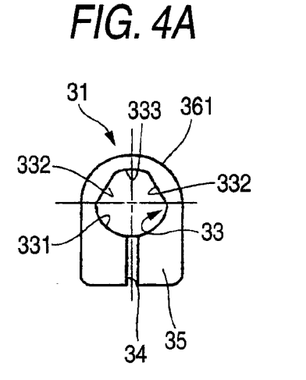
FIGS. 4B, 4B are component diagrams showing a modified example of the extension shaft shown in FIGS. 3A, 3B.
Figure 4B:
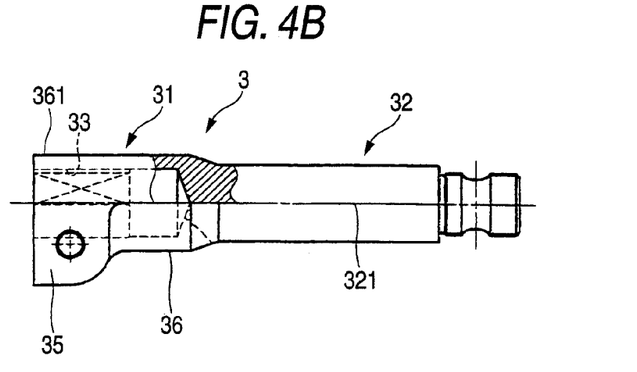

An extension shaft 3 shown in FIGS. 4A, 4B is an example in which the shape of the non-circular hole 23 of the extension shaft 2 shown in FIGS. 3A, 3B are modified. Namely, as shown in FIGS. 4A, 4B, a non-circular hole 33 of the extension shaft 3 is made up of a semi-circular hole 331 which is centered at a center axis 321 of a shaft portion 32, inclined planes 332, 332 which extend from both ends of the semi-circular hole 331 with an inclination of, for example, 30 degrees, and an arc hole 333 which connects smoothly both ends of the inclined planes 332, 332. Note that while the case is described here in which the inclination angle of the inclined planes 332, 332 is 30 degrees, the invention is not limited thereto, and hence, they can be inclined at 60 degrees or any of arbitrary angles.

A substantially rectangular clamping portion 35 having a slot 34 is formed on the semi-circular hole 331 side of the fastening portion 31. In FIG. 4B, a circular outer circumference 36, which is concentric with the shaft portion 32 and which has a larger diameter than the diameter of the shaft portion 32, is formed on a right-hand side half portion of the fastening portion 31. In addition, a semi-circular outer circumference 361, which has the same diameter as that of the circular outer circumference 36, is formed on an exterior of the fastening portion 31 on the side where the inclined planes 332, 332 are formed.

An extension shaft 4 shown in FIGS. 5A, 5B is an example in which the shape of the non-circular hole 23 of the extension shaft 2 shown in FIGS. 3A, 3B are modified. Namely, as shown in FIGS. 5A, 5B, a non-circular hole 43 is made up of a lower arc hole 431 and an upper arc hole 433 which are centered at a center axis 421 of a shaft portion 42 and parallel planes 432, 432 which extend in parallel with each other from both ends of the lower arc hole 431 and the upper arc hole 433.

A substantially rectangular clamping portion 45 having a slot 44 is formed on the lower arc hole 431 side of the fastening portion 41. In FIG. 5B, a circular outer circumference 46, which is concentric with the shaft portion 42 and which has a larger diameter than the diameter of the shaft portion 42, is formed on a right-hand side half portion of the fastening portion 41. In addition, a semi-circular outer circumference 461, which has the same diameter as that of the circular outer circumference 46, is formed on an exterior of the fastening portion 41 which extends over the upper arc hole 433 and upper half sides of the parallel planes 432, 432.

A manufacturing method for the extension shaft 2 shown in FIGS. 3A, 3B is shown in FIGS. 6A-10B. As shown in a first step illustrated in FIGS. 6A, 6B, firstly, the shaft portion 22 and the circular outer circumference 26 are formed by forging from a round rod-shaped material.

Next, as shown in a second step illustrated in FIGS. 7A, 7B, the substantially rectangular clamping portion 25 is formed by forging substantially on a left-hand side half portion of the circular outer circumference 26 as viewed in FIG. 7B, while shortening the axial length of the circular outer circumference 26.

At the same time as this occurs, paddings 27, 27, which project further radially outwards than the circular outer circumference 26, are formed, by forging, to extend longitudinally from a left end of the circular outer circumference 26 to lie over substantially 80% thereof as viewed in FIG. 7B. As viewed in FIG. 7A, the paddings 27, 27 are formed in such a manner as to project in an arc-like fashion from the center axis of the shaft portion 22 upwardly leftwards and rightwards at an angle of 45 degrees, respectively.

Next, as shown in a third step illustrated in FIGS. 8A, 8B, a circular hole (preparation hole) 28 which is concentric with the center axis 221 of the shaft portion 22 is formed by forging by substantially the same length as the axial length of the circular outer circumference 26. The circular hole 28 is formed to have substantially the same diameter as that of the semi-circular hole 231 in the extension shaft 2 which has been described by reference to FIGS. 3A, 3B. The circular hole 28 may be forged using a cylindrical punch or be cut by a drill or the like.

Next, as shown in a fourth step illustrated in FIGS. 9A, 9B, a punch 5 having a non-circular outer circumference is inserted into the circular hole 28, and while restraining the outer circumference of the clamping portion 25 and the outer circumference of the circular outer circumference 26 by a die 6, the extension shaft 2 is inserted into the die 6, so as to perform a so-called ironing operation. An outer circumferential shape of the punch 5 is formed into the same shape as the non-circular hole 23 in the extension shaft shown in FIGS. 3A, 3B. Namely, a semi-circular outer circumference 51 which has the same shape as the semi-circular hole 231 in the extension shaft 2 and inclined planes 52, 52 which have the same shapes as the inclined planes 232, 232 of the extension shaft 2 are formed on the punch 5.

In addition, an inner circumferential shape of the die 6 is formed in the same shape as the external shape of the fastening portion 21 of the extension shaft shown in FIGS. 3A, 3B. Namely, a rectangular portion 61 which has the same shape as the clamping portion 25 of the extension shaft 2 and a semi-circular inner circumference 62 which has the same shape as the semi-circular outer circumference 261 of the extension shaft 2 are formed on the die 6.

Consequently, when the punch 5 having the non-circular outer circumference is inserted into the circular hole 28 and is caused to continue to be inserted in the axial direction while restraining the outer circumference of the clamping portion 25 and the outer circumference of the circular outer circumference 26 by the die 6 (namely, the ironing operation is performed), the paddings 27, 27 are pressed by the semi-circular inner circumference 62 of the die 6 so as to be forced into the interior of the circular hole 28. The volume of the paddings 27, 27 is set to be substantially the same as a volume obtained by subtracting the volume of the non-circular hole 23 in the extension shaft 2 (the volume of the non-circular outer circumferential portion of the punch 5) from the volume of the circular hole 28.

As a result, the circular hole 28 is deformed, and the paddings 27, 27, which have been forced into the circular hole 28, are brought mainly into the inclined planes 52, 52 of the punch 5, whereby as shown in FIGS. 10A, 10B, the non-circular hole 23, which is made up of the inclined planes 232, 232 and the semi-circular hole 231 which have been formed into the desired shapes, is formed in the extension shaft 2.

In addition, as a result of the paddings 27, 27 being pressed by the semi-circular inner circumference 62 of the die 6 so as to be forced into the interior of the circular shape 28, that is, the ironing operation being performed, as shown in FIGS. 10A, 10B, the semi-circular outer circumference 261, which has the same diameter as that of the circular outer circumference 26, is formed on the side of the exterior of the fastening portion 21 where the inclined planes 232, 232 are formed, this completing the formation of the fastening portion 21 of the extension shaft 2.

Consequently, according to the fastening portion for the steering apparatus and the manufacturing method for the same fastening portion of the invention, since the necessity of adding the padding which is formed into the symmetrical shape with the clamping portion 25 is obviated, the steering apparatus fastening portion is reduced in weight, and only a small space has to be required for attachment of the steering apparatus fastening portion to the vehicle body. In addition, since there occurs no thermal deformation attributed to welding, the dimension accuracy is stabilized.

While in the embodiment that has been described heretofore, the circular hole 28 is formed, the invention is not limited to the circular hole 28, and hence, any hole may be adopted provided that its volume corresponds to a sum of the volume of the paddings 27, 27 and the volume of the non-circular hole 23 in the extension shaft 2.

In addition, while in the embodiment described above, the invention has been described as being applied to the fastening portion between the extension shaft and the pinion shaft, the invention can be applied to an arbitrary steering apparatus fastening portion which fastens a non-circular shaft portion of a rotational shaft for transmission of a rotational torque exerted on the steering wheel through the steering apparatus.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A manufacturing method for a fastening portion for a steering apparatus which comprises:

a shaft portion which transmits rotational torque inputted from a steering wheel to a rotational shaft; and the fastening portion which is integrally provided at one end of the shaft portion and comprises a non-circular hole to which a non-circular shaft portion at an end of the rotational shaft is fitted, the manufacturing method comprising:

forming a preparation hole of which volume is larger than a volume of the desired non-circular hole in the fastening portion;

forming a padding of which volume is equivalent to a difference between a volume of the preparation hole and the volume of the desired non-circular hole on an outer circumference of the fastening portion;

inserting a punch of which shape of a non-circular outer circumference is the same as the shape of the desired non-circular hole into the preparation hole; and restraining the outer circumference of the fastening portion by a die of which an inner circumferential shape is the same as an outer circumferential shape of a desired fastening portion and pushing the padding into the preparation hole so as to make the preparation hole to the desired non-circular hole.

2. The manufacturing method for a fastening portion for a steering apparatus as set forth in claim 1, wherein the preparation hole is a circular hole.

* * * * *